(12) United States Patent
Wilde

(10) Patent No.: US 6,890,424 B1
(45) Date of Patent: May 10, 2005

(54) PROCESS FOR EXTRACTING FIXED AND MINERAL OILS

(75) Inventor: Peter Frederick Wilde, Thirsk (GB)

(73) Assignee: Naturol Limited, London (GB)

( * ) Notice: Subject to any disclaimer, the term of this patent is extended or adjusted under 35 U.S.C. 154(b) by 0 days.

(21) Appl. No.: 09/890,043

(22) PCT Filed: Jan. 20, 2000

(86) PCT No.: PCT/GB00/00125

§ 371 (c)(1),
(2), (4) Date: Oct. 2, 2001

(87) PCT Pub. No.: WO00/43471

PCT Pub. Date: Jul. 27, 2000

(30) Foreign Application Priority Data

Jan. 25, 1999 (GB) .............................. 9901617
Mar. 5, 1999 (GB) .............................. 9905054

(51) Int. Cl.[7] .................. C10G 21/00; C10G 21/02
(52) U.S. Cl. ............... 208/311; 208/313; 208/315; 208/320; 208/340
(58) Field of Search ................. 208/311, 313, 208/315, 320, 340; 435/309.1; 422/288

(56) References Cited

U.S. PATENT DOCUMENTS 4,331,695 A 5/1982 Zosel .................... 426/430
5,005,655 A 4/1991 Stokke et al. .................. 175/66

FOREIGN PATENT DOCUMENTS

| EP | 616 821 | 9/1994 |
| GB | 2 276 392 A | 9/1994 |
| GB | 2 320 024 A | 6/1998 |
| WO | WO 95/26794 | 10/1995 |

OTHER PUBLICATIONS

Eldridge, R.B., "Oil Contaminant Removal from Drill Cuttings by Supercritical Extraction," *Ind. Eng. Chem. Res.*, 35(6):1901–1905, 1996.

*Primary Examiner*—Walter D. Griffin
*Assistant Examiner*—Tam Nguyen
(74) *Attorney, Agent, or Firm*—Seed IP Law Group PLLC

(57) ABSTRACT

The present invention relates to a method of extracting and concentrating oils from materials in which the oils are already dispersed. More particularly, the present invention is concerned with the extraction of fixed oils or mineral oils from materials using a process of solvent extraction which is performed under elevated pressure and temperature. The solvent medium may be HFC 134a alone, or HFC 134a in combination with a suitable co-solvent which can be determined in accordance with the invention.

8 Claims, 1 Drawing Sheet

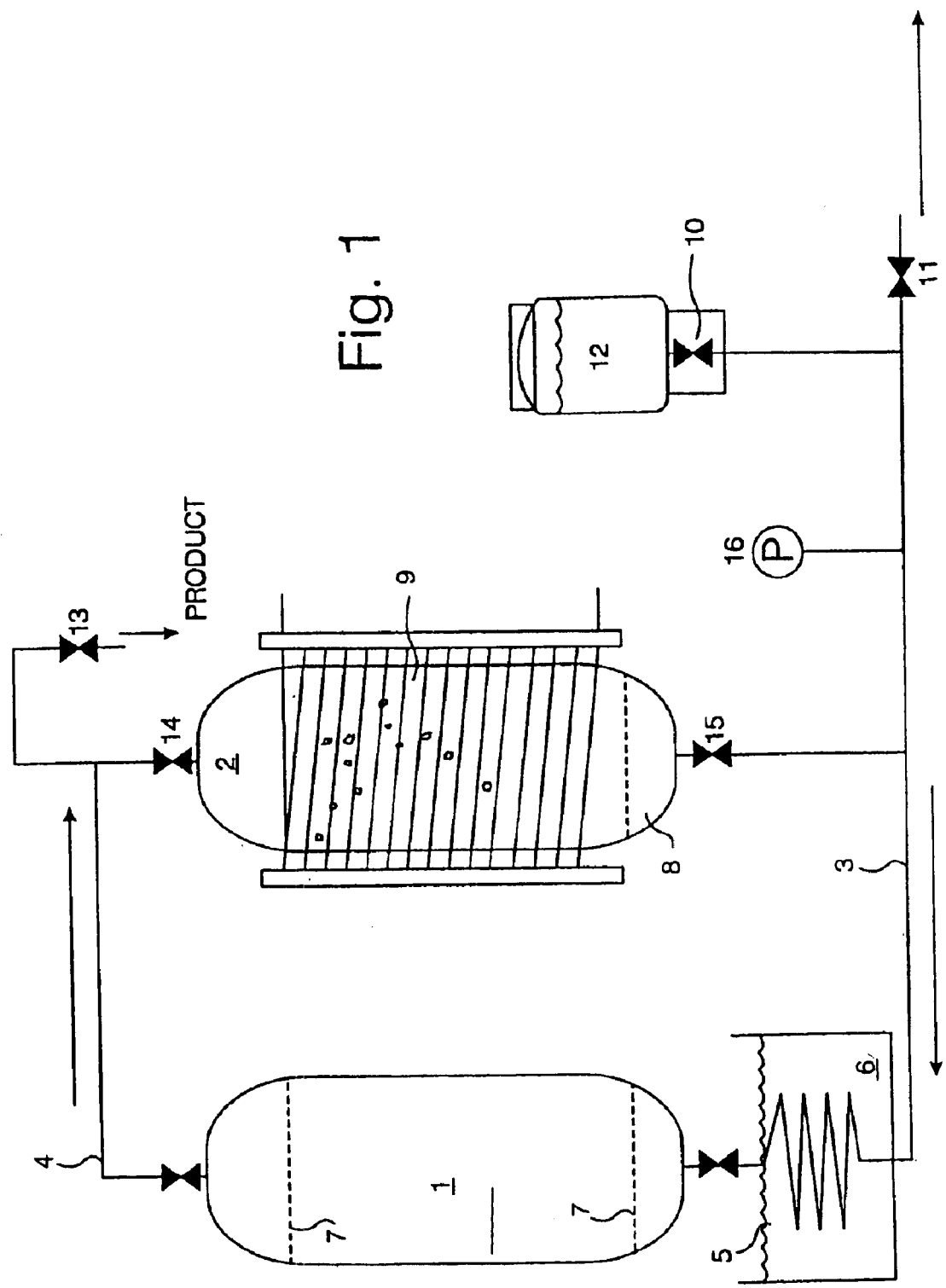

PROCESS FOR EXTRACTING FIXED AND MINERAL OILS

The present invention relates to a method of extracting and concentrating oils from materials in which the oils are already dispersed. More particularly, the present invention is concerned with the extraction of fixed oils or mineral oils from materials using a process of solvent extraction which is performed under pressure.

The term "Fixed Oil" is usually used to describe oils of vegetable or animal origin which are not volatile oils. They routinely comprise natural mixtures of mono-, di and tri-glycerides, fatty acids, sterols (and their esters) and natural waxes.

"Mineral Oil" is a term usually used to describe petrochemical oils often derived from below ground level, which are normally mixtures of aliphatic and aromatic hydrocarbons of a very wide variety of chain length and molecular weight. These oils are often the sources of lubricating and fuel oils.

In a previous patent specification (GB 2,276,392), we described the use of 1,1,1,2-tetrafluoroethane (HFC 134$a$ or R 134$a$) as a solvent for the extraction of fragrant and aromatic essential oils from natural sources. The term "Essential Oil" is usually used to describe those volatile oils of low molecular weight which incorporate the fragrance and flavour of components derived from plant materials.

However HFC 134a is in fact a very poor solvent for many compounds, particularly less volatile compounds. Thus, whilst HFC 134a is able to dissolve some essential oils thereby facilitating extraction of such oils from plant-based materials, this solvent is not able easily to dissolve compounds of lower volatility such as fixed oils. HFC 134a is therefore capable of extracting only very high quality fragrant and aromatic essential oils ie delicate oils of high volatility and low molecular weight and it will not dissolve the fixed oils which are also frequently associated with these components in the natural raw material.

Furthermore, HFC 134a (which was developed in the late 1980's as a refrigerant intended to replace the environmentally unacceptable R12-dichloro difluoromethane) is so poor a solvent that it is not even adequately miscible with or soluble in the mineral oils traditionally used as lubricants in refrigeration compressors. This problem was so severe, in fact, that the chemical industry was obliged to synthesise completely new families of lubricants for use in refrigeration compressors in which HFC 134a was to be used as the refrigerant. HFC 134a is therefore conventionally regarded as a very poor solvent.

Presently, there is no convenient and economical method of obtaining fixed oils from natural sources. The preparation of bulk commodity "fixed oils" for culinary cosmetic, food, pharmaceutical etc use, frequently from seeds and nuts such as corn (maize), ground nuts, sunflower seeds, grape pips, rape seeds, olive pits, oil palm nuts, sesame seeds, 'evening primrose' seeds, cocoa beans, copra (dried coconut flesh) etc, is normally carried out in the first instance by a pressing procedure. This is not a particularly efficient method of obtaining the oils and results in significant wastage.

The seeds or other raw materials are mechanically disrupted and then the oil is squeezed out of the disrupted seed bio-mass in some form of filter press. Hydraulic, screw and continuous cavitation screw presses are well known internationally as means of expelling such oils. The oil obtained by such pressing (in the case of olive oil, for instance) is referred to in product for retail sale as virgin or extra virgin or cold-pressed olive oil.

Such presses, however, are only able to expel and remove a proportion of the fixed oils from the pressed cake. The remaining oil in the cake may be allowed to remain there and such. "oil caked" is widely traded as animal food. However, in some cases (for example soya, evening primrose etc) it would be economically foolish to discard the cake at this stage and steps are taken to obtain more oils from the cake by means of solvent extraction.

In these circumstances, the oil cake is usually stirred or otherwise dispersed and brought in contact with a counter-current of solvent such as hexane in which the fixed oil dissolves. In the past, benzene, dichloromethane and other good solvents for such oils have been employed for this purpose. However, the traditional good solvents suffer the drawback that they are frequently toxic or hazardous to health.

The solution of fixed oil in the solvent is filtered and the solvent is then evaporated to release the oil. To achieve optimum economics, the cake may be "rinsed" several times with fresh solvent in order to remove the final traces of oil from it. After drying to remove the solvent the cake may then be sold for inclusion in animal food. However, traces of solvent may remain in the animal cake.

Steam injection into the oil (stripping) is frequently used as a means of lowering much of the final residue of solvent from the oil. However, it is inevitable that a proportion of residual solvent is still present and this is detectable in the oil derived by such processes. The disadvantages of the process of solvent extraction thus include the loss of solvent and the risk of fire hazards since the solvent is usually highly flammable.

Moreover the loss of solvent almost always occurs as a vapour in the form of a "VOC" (volatile organic compound) which is highly undesirable from an environmental viewpoint because it can lead to photochemical ozone generation.

The finished product from such processes are often intended for public consumption and the presence of toxic or harmful residues may present difficulties when seeking regulatory approval of the finished product.

The evaporation of the solvent from the solution of the oil, and the solvent recovery by condensation is expensive on account of the energy costs.

In WO95/26794, a process is disclosed which comprises contacting raw material with a hydrofluorocarbon-containing solvent and separating the liquor thus obtained from the raw material. The extracted components, such as pesticides, pharmaceuticals or flavoured or aromatic oils, are then obtained from the liquor by evaporation or distillation of the solvent.

The present invention thus aims to provide an economical process which is also able to provide the extracted oils in relatively high yield. It is also an aim to provide a quick extraction process which can be used commercially.

It is also an aim to provide a process which is easy to run and which does not require bulky or complicated apparatus. It is another aim to use a solvent which is not environmentally damaging and which does not have any significant photochemical ozone generating potential. Such a process aims to eliminate or reduce the losses of solvent during the extraction process. Indeed, it is a further aim to provide a process in which solvent losses are minimised so that there is substantially 100% solvent recovery.

It is also an aim to avoid the risk of fire or explosion by using a non-flammable solvent system, or at least a system having a significantly reduced risk of fire or explosion.

It is also an aim to achieve a reduction in the or the absence of any toxic solvent residues in the final product. It is thus intended to dispense with the need for the elimination of or evaporation and condensation of large quantities of solvents.

According to one aspect of the present invention, there is a provided a method of extracting oil from a substance, the method comprising the steps of:

a) contacting the substance with a solvent comprising HFC 134a, and optionally one or more co-solvents, in a sealed first vessel;

b) elevating the temperature of the sealed first vessel, and optionally causing agitation of the heated mixture;

c) separating the resulting solution from the substance by transferring the solution to a second vessel;

d) cooling at least the second vessel to release oil from solution; and e) separating the oil from the solution.

Surprisingly, we have found that HFC 134a, though a very poor solvent for fixed and mineral oils at low temperature, is actually a very much better solvent at elevated temperature. At 40 degrees Celsius for example, cocoa butter (a fixed oil) dissolves in HFC 134a to a substantial extent, despite the fact that at a temperature only a few degrees lower, ie room temperature, cocoa butter does not dissolve to any appreciable extent in HFC 134a. The reason for this significant change in solubility of cocoa butter and other fixed and mineral oils is not presently understood. It is however speculated that the effect may be due perhaps to a change in the viscoelastic properties of the 'bound' fixed oil or mineral oil at a slightly elevated temperature.

According to another aspect of the present a invention, there is provided a sealable apparatus comprising first and second vessels, each vessel having at least one closable value through which solvent may pass, wherein the first and second vessel are in fluid communication with one another by means of the closable valves, wherein the first vessel is adapted to receive a substance from which oil is to be extracted and incorporates a filtering device to prevent passage of the substance out of the first vessel through the or each valve, and wherein a solvent comprising HFC 134a together with one or more optional co-solvents is provided in the first vessel and may be transferred between the first and second vessels via the or each valve.

In an embodiment, the or each valve is a one way valve and the first and second vessels each have an inlet valve and an outlet valve, the apparatus being arranged in the form of a circuit so that the outlet valve of the first vessel is connected to the inlet valve of the second vessel, and the outlet valve of the second vessel is connected to the inlet valve of the first vessel, so that the flow of solvent around the circuit occurs in one direction only.

In another embodiment, the first vessel is provided with a heating means and/or is associated on its inlet side with means for heating incoming solvent.

In a further embodiment, the second vessel is provided with cooling means and/or is associated on its inlet side with means for cooling incoming solution.

In a further embodiment the apparatus includes a reservoir of additional solvent and means for introducing or removing solvent from the circuit. Preferably, the point of addition or removal of solvent from the circuit is between the outlet side of the second vessel and the inlet side of the first vessel.

In another embodiment, the apparatus includes means for withdrawing from the second vessel directly and/or from the inlet side of the second vessel oil which has separated from the solvent.

In a further embodiment, the apparatus includes means for determining the pressure in the circuit and/or the temperatures of the first and second vessels.

In a further embodiment, the first and second vessel's are transparent pressure vessels capable of withstanding pressures of not more than 25 bar.

HFC 134a is a very poor solvent at ambient temperature as discussed above. At elevated temperatures its dissolving properties are improved somewhat but they are still relatively poor. Some solutes (such as fatty acids and triglycerides) are only slightly soluble even in hot HFC 134a ie a temperature of about 40 to 60° C.

In an embodiment of the process of the present invention, the solvent may be a mixture of HFC 134a and a co-solvent in which the desired oil is relatively soluble. The dissolving properties of HFC 134a are significantly increased by the addition of a co-solvent.

Suitable co-solvents which can be added to HFC 134a may be liquids at room temperature or liquefied gases.

For example, hydrocarbons such as the alkanes, benzene and its esters, low boiling aliphatic esters such as acetates and butyrates, ketones such as acetone, methyl isobutyl ketone, methyl ethyl ketone, chlorinated, fluorinated and chlorofluorinated hydrocarbons such as dichloromethane and dichloro difluoromethane, ethers and such as dimethyl ether and diethyl ether, dimethyl formamide, tetrahydrofuran, dimethyl sulphoxide, alcohols such as methyl alcohol, ethyl alcohol, n-propanol, isopropanol, acids such as acetic acid, formic acid and even acetic anhydride, nitrites such as acetronitrile (methyl cyanide), anhydrous liquefied ammonia and other liquefied gases such as sulphur dioxide, nitric oxide, nitrogen dioxide, nitrous oxide, liquefied hydrogen sulphide, carbon disulphide, nitromethane, and nitrobenzene could all be used in this process.

Liquefied gases are preferred for ease of recovery of the extracted oil. These also have the benefit of resulting in low residue levels in both oil and spent raw material.

It is also important that the co-solvent does not damage the raw-material or the extract chosen and that the co-solvent is not toxic or hazardous to health. For this reason, lower alkanes and lower alcohols (ie $C_5$ or lower), acetone, dimethyl ether and diethyl ether are particularly preferred as co-solvents.

One example of the use of a solvent mixture is in the extraction of ground nut oil. Ground nut oil does not appreciably dissolve in HFC 134a alone even at 60 degrees Celsius (when its vapour pressure is of the order of 16 bar).

Ground nut oil readily dissolves in liquid butane at ambient temperature. However, this fact is of little value in an extraction process because a solution of ground nut oil in liquid butane may be cooled to very low (sub-zero) temperatures and still the solute will not precipitate from solution. There is also a fire risk with the use of butane. However, a carefully chosen mixture of a co-solvent, such as liquid butane, and HFC 134a, which is tailored to the particular requirements of the extraction process may be used in the process of the present invention.

The appropriate co-solvent and HFC 134a:co-solvent ratio is determined as follows.

A bottle together with a removable seal is weighed and the weight recorded (Weight A). This assembly should be designed to be able to withstand a pressure of say 10 BarG.

Into the bottle is placed a sample of the solute-containing raw material to be extracted.

The bottle and seal is weighed again and the weight recorded (Weight B). The bottle is then closed and sealed. The difference between weight B and A is the weight of the solute.

The co-solvent alone is introduced into the bottle and the mixture shaken until the contents are homogenuous and the solute is in complete solution. The bottle and contents are weighed again and the final weight of the bottle and contents are recorded (Weight C). The difference between weight 9 and Weight C is the weight of the added co-solvent.

HFC 134a is then progressively introduced into the bottle. At first no obvious change takes place, but as the quantity of HFC 134a increased, the contents of the bottle will be seen to turn from crystal clear to opalescent.

The weight of the bottle and contents is again recorded (Weight D). The difference between Weight D and Weight C is the quantity of HFC 134a added.

In order to ensure that the composition has reached its optimum, the bottle may now be placed in a refrigerator, whereupon the contents will become cloudy and a clear and distinct layer of oil will separate and float on the lower layer of clear solvent. The solvent at low temperature can then be withdrawn and introduced to another bottle charged with more of the solute-containing raw material. This cold solvent will not dissolve the solute, but on warming, it will be seen to form a homogeneous solution (which will itself separate again into two layers on cooling).

If this procedure is carried out carefully, it will allow calculation of the composition of a solvent mixture. For example: The total weight of solvent used is D–B. the weight of cosolvent is C–B and the weight of HFC 134a is D–C.

Hence the weight % composition of the solvent is:

Co-solvent=$(C-B/D-B) \times 100\%$

HFC 134a=$(D-C/D-B) \times 100\%$

The % concentration of solute in the solution

=$(B-A/D-A) \times 100\%$

EXAMPLE

A 210 ml capacity PET bottle (to which an aerosol valve can be removably fitted) was weighed. The assembly weighed 48 grams.

Into the bottle was placed a sample of sunflower seed oil. The assembly now weighed 67 grams. Hence there was 19 grams of sunflower seed oil in it. The bottle was sealed.

Liquid butane was introduced into the bottle (via the aerosol valve) and weighed again. It now weighed 97 grams. Hence 30' grams of liquid butane had been introduced. The contents of the bottle (on shaking) were crystal clear.

HFC 134a was now introduced into this mixture. When the bottle weighed 163 grams, the contents became an opalescent but otherwise homogenous (single phase) liquid. 66 grams of HFC 134a had been added.

Placing this bottle in a refrigerator at 4 degrees Celsius for half an hour caused two layers to form. The top layer was a pale yellow oily liquid and the lower one a water white clear liquid.

Standing at room temperature for a few minutes caused the contents of the bottle to warm up and (on shaking), the contents again became an opalescent homogeneous single phase liquid.

The composition of the solvent was (from the above quoted figures) 38% butane, 62% HFC 134a and the weight concentration of sunflower seed oil in solution in this solvent was 20%.

The invention will now be described with reference to FIG. 1 which shows an apparatus suitable for continuous extraction of fixed and mineral oils according to one embodiment of the process of the present invention.

Two vessels (1) and (2) equipped with closeable valves were coupled together via two sets of tubing (3, 4). Both vessels are capable of withstanding pressure typically up to 25 bar. Below vessel (1), the tubing (3) was in the form of a coil (5) sitting in a bath of liquid (6) which could be heated and maintained at a pre-selected temperature. The coil of tubing (5) could, however, be heated by another means or vessel (1) could be heated directly.

Vessel (1) was equipped with an internal filter (7) at both ends, whereas vessel (2) was equipped with a filter (8) only at the lower end. The second vessel (2) was surrounded by coils (9) containing a flow of cooling liquid and the outside of the coils was insulated. Other means of cooling vessel (2) could also be used, for example a stream of cooling gas or a cooling bath.

The circuit was furnished with an inlet (10) and outlet (11) valves for solvent. During operation of the equipment, the inlet valve was coupled to a solvent reservoir (12) which could be used to both fill the system with solvent and maintain the level of solvent during operation. Outlet valve (11) was provided to enable the system to be drained.

At the tope of vessel (2), a valve (13) is fitted to facilitate the recovery of oil when this becomes necessary desirable. A pressure gauge (16) may be provided in the circuit.

The operation of the equipment may be described as follows:

1. vessel (1) (which has removable end caps) is charged with the material from which oil is to be extracted (usually in the form of a finely divided particulate solid). The end caps and filters are then replaced. The vessel is then connected to the remainder of th equipment.
2. The equipment (now fully sealed) is then fully charged with solvent from the bulk solvent storage tank (12) (which remains connected to the equipment throughout the operation). Air is allowed to escape from the equipment via controlled opening of the valve (13).
3. The hearing bath (6) is then filled with water or oil and the heating means turned on.
4. Cold liquid or gas is circulated round the cooling coils (5) causing the temperature of the second vessel (2) (and its contents) to cool.

As the temperature of the liquid in the heating bath rises, so does the temperature of solvent in the tube below vessel (1). This, of course, causes hot solvent in vessel (1) to rise through the contents of the vessel (1) due to natural convection. The contents of vessel (1) are restrained inside vessel (1) by the filters (7) disposed at the top and bottom. The liquid displaced upwards is replaced by cold liquid falling through vessel (2) due to convection.

The entire liquid in the circuit thus becomes mobile and circulating. As hot liquid passes up through the contents of vessel (1) oil is exacted from this material. As the solution enters the top of vessel (2) it is cooled and its solute (the oil) precipitates out of solution.

Because the oil is lighter than the solvent, it floats to the top of vessel (2) and collects there as it is not able to pass out of the bottom of vessel (2).

When it is considered that sufficient oil has been extracted, all the valves are closed except valves (14) (the inlet valve for vessel (2)) and valve (15) (the outlet valve for vessel (2)). Valve (13) is thus opened to release the oil and the oil can be decanted into a bottle.

The system may be emptied after use by allowing solvent to drain out of valve (1) into a suitable container for recover by evaporation and re-cycling.

It will be immediately apparent to one versed in the art, that this process is capable of producing oil without any evaporative step. Since evaporation of the solvent is one of the major costs involved in more traditional methods of extraction, this constitutes a major improvement in the extraction of such oils and represents a significant cost saving.

Since the solvent is neither flammable, nor toxic, nor environmentally damaging and (in normal operation) is never released into the environment, the process of the present invention represents a significant improvement over current technologies.

In another embodiment of the process (not shown), the apparatus comprises two sealable vessels (which are preferably transparent and made of strengthened or reinforced glass) each being capable of withstanding a pressure of up to 20 bar or even 25 bar. Each vessel is equipped with a closeable valve which acts as an inlet and an outlet valve. One vessel is also equipped with a removable filtering device, such as a wire gauze or wire wool to prevent the exit of raw material from the vessel at the same time as the solvent is withdrawn.

The two vessels are connected to each other via their inlet/outlet valves so as to form a sealed unit. Typically each vessel is 50 mls to 2000 mls capacity, and preferably 100 mls to 500 mls. Such an apparatus is easily assembled and handled. However, there are no particular limitations other than the usual practical limitations, on the upper size of such apparatus.

In use, raw material is placed in the first vessel and the extraction medium (ie the solvent) is also introduced into the first vessel. The inlet/outlet valve of both vessels are then closed and the ensemble is warmed, typically to 40°–60° (and preferably not more than 50° C.), in an oven or using other suitable heating means. The apparatus may be agitated during heating or may contain agitation means such as a magnetic flea.

After an appropriate residence time at the elevated (holding) temperature, typically in the range 1 to 20 minutes and preferably in the range 3 to 8 minutes from the point of view of efficiency and cost effectiveness, the solution is transferred from the first vessel to the second vessel and the ensemble is cooled to room temperature or lower. Ideally, the ensemble is cooled to a temperature in the range −10 to 25° C. and preferably in the range 0° to 20° C. Cooling below −10° C. is possible but increases the costs and complexity of the process.

Transfer of the solution is achieved via the inlet/outlet valves and the raw material remains in the first vessel on account of the filter. The valves are closed following transfer of the solvent and before cooling is commenced.

On cooling, the extracted oil precipitates out of solution and begins to aggregate. Since the extracted oil is invariably significantly less dense that the solvent medium the extracted oil floats on the top of the solvent layer as a separate immiscible/insoluble layer. The extracted oil can thus be easily separated by decanting. The solvent, which is almost entirely free of the oil, can then be returned to the first vessel for use in a further extraction cycle. This process can be repeated several times if desired. From a practical point of view, 10 cycles is the upper limit with 3 to 5 cycles being preferred on the basis of efficiency and time.

This manual procedure, though highly effective, was somewhat tedious to carry out and the whole process is preferably performed as a continuous operation as described above.

The present invention will now be illustrated be means of the following Examples in which Example 1 described the isolation of a fixed oil and Example 2 describes the isolation of a mineral oil. The procedures described in these Examples are, of course, applicable to other fixed and mineral oils.

Example 1

A sample of 20 grams of roasted and finely ground cocoa beans (as raw material) was placed in a transparent sealable container furnished with a closeable valve. The container was capable of withstanding pressures of 20 bar. The in/outlet valve of the container was equipped with a filter to retain ground-up bio-mass (the raw material) within this first vessel. 50 grams of HFC 134a was introduced into the vessel and the vessel was then a sealed. A slurry was formed between the cocoa bean solids and the HFC 134a.

A second (empty) transparent vessel which was similar to the first vessel was prepared and the two vessels were connected by means of their inlet/outlet valves. The valves of both vessels were both closed.

The two connected vessels, one containing the slurry and HFC 134a and the other empty, were then placed in an oven until the temperature of the contents rose to 50 degrees Celsius.

When the two vessels had warmed up to 50 degrees Celsius, the valves were opened so that the warm HFC 134a was able to pass from the vessel containing the bio-mass to the empty vessel. The valves were then closed.

The transfer and collection of the clear warm HFC 134a was readily accomplished via the filters. No boi-mass was present in the clear solution which had been transferred to the second vessel.

Both vessels were allowed to cool.

Upon cooling of the HFC 134a, it was observed that cocoa butter (ie cocoa oil) had precipitated out of solution as a flocculent white precipitate.

Furthermore, due to the difference between the specific gravity of the "oil" (which in most cases is substantially lower than 1.00) and the solvent (which is substantially greater than 1.2) the precipitate was seen 7 to rise to the surface of the (now cold) HFC 134a solvent leaving a clear layer of HFC 134a below it. A small amount of further precipitation of cocoa butter solids could be encouraged by refrigeration of the second vessel containing the HFC 134a.

Recovery of the HFC 134a layer was achieved either by decantation or by further filtration.

The cold solvent layer which then contained substantially no dissolved cocoa oil could then be returned to the vessel containing the original ground cocoa bean bio-mass and/or new bio-mass to be re-used in the extraction process.

When the first vessel was again warmed more cocoa butter could be extracted into the solvent, the solvent transferred is the second vessel and cooled.

This cycle was repeated several times and a substantial amount of cocoa butter concentrated in the second vessel. The roasted and ground cocoa beans in the first vessel were largely devoid of cocoa butter after only a few cycles (about 5).

Example 1

A sample of North Sea drilling mud comprised a highly acidic moist powder of finely ground mineral particles, water and oil. In the past, mud of this type has been jettisoned from the drill platform directly into the sea. This practice is coming under close scrutiny for environmental reasons as it is very damaging to the local environment.

The process of the present invention allows recovery of some of the contaminating oil from such slurries. Disposal of the treated residue into the sea could then be allowed to continue without damage to the environment. The value of the oil recovered could help off-set the, inevitable on-costs of treatment.

100 grams North Sea drilling mud was loaded into a 1 liter vessel such as that described as vessel A in FIG. 1. An entire system as illustrated in FIG. 1 was then assembled and sealed and filled with solvent which in this case was a mixture of HFC 134a (90% w/w) and butane (10% w/w)].

The temperature of the contents of vessel A was allowed to rise to about 50° C. as the contents of vessel B were cooled to about 0° C. Solvent circulated quickly around the system and a pale yellow oil began to accumulate at the top of vessel B.

After 20 minutes of operation at equilibrium conditions (after stable temperatures had been achieved in vessels (1) and (2), the system was system was shut down. All valves (except valves (14) and (15) and the bottle shut-off valve (10) were closed. Upon opening of valve (13), solvent emerged and was collected in a bottle. Opening of valve (14) also caused solvent to emerge into the bottle. In so doing, the layer of oil in vessel (2) was observed to rise. As oil emerged through valve (13), it was collected into a second sample bottle.

A small quantity of solvent was seen to "boil-off" the oil sample. On a larger scale, this solvent could have been recovered and re-used.

The oil was found by analysis to be of excellent (light) and saleable quality.

The present invention thus addresses many of the disadvantages listed above and provides a means of obtaining fixed oils and mineral oils in good yields in a form approaching 100% purity. The following points relate to practical operating matters for the process of the present invention:
Temperature Difference Between Vessels (1) and (2)

For maximum economic use of equipment designed to prepare extracts such as those of interest to us, it is beneficial to operate vessels (1) and (2) at widely dissimilar temperatures. (The difference between these temperatures is commonly referred to as "ΔT"). The larger the "ΔT" the better the equipment will perform.

However, limits on "ΔT" are imposed by the design and fabrication of the equipment.
Upper Limit of Operating Temperature of Vessel (1)

When HFC 134a is used, whether mixed with another solvent or not, a rise in the temperature of operation of Vessel (1) will automatically cause an increase in the pressure (vapour pressure) within the sealed system. Indeed, the highest operating temperature of vessel (1) must obviously never exceed and be less than the "critical temperature" of the solvent (mixture) in use.

Also this highest operating temperature would be limited to a temperature above which damage to the raw-material or the extract might occur.
Lower Limit of Operating Temperature of Vessel (2)

The operating temperature of Vessel (2) must be as low as can be conveniently arranged. Sub-ambient and even refrigeration temperatures can be used.

The lower limit of operation of Vessel (2) will be determined by the characteristics of the solution (and its ability to dissolve solute). The solute must dissolve in the solvent as "poorly" as can be arranged and the "poverty" of this dissolution can be enhanced by lowering the temperature of operation of Vessel (2). The low limit is also governed by the viscosity of the resulting oil since at very low temperatures some oils may become difficult to handle.

What is claimed is:

1. A process of extracting oil from a substance comprising the steps of:
    a) contacting the substance with a solvent comprising HFC 134a, and optionally one or more co-solvents, in a sealed first vessel;
    b) elevating the temperature of the sealed first vessel, and optionally causing agitation of the heated mixture, to allow for the oil to be extracted from the substance to the solvent, wherein a solution is formed comprising the oil, the solvent and one or more optional co-solvents;
    c) separating the solution from the substance by transferring the solution to a second vessel;
    d) cooling at least the second vessel to allow for the oil to precipitate from the solution; and
    e) separating the oil from the solution.

2. The process of claim 1, wherein the co-solvent is liquid at room temperature.

3. The process of claim 1, wherein the co-solvent is selected from the group comprising: hydrocarbons; low boiling aliphatic esters;
    ketones; chlorinated, fluorinated and chlorofluorinated hydrocarbons; ethers; dimethyl formamide; tetrahydrofuran; dimethyl sulphoxide; alcohols; carboxylic acids; acetic anhydride; nitrites; anhydrous liquefied ammonia; liquefied sulphur dioxide; nitric oxide; nitrogen dioxide; nitrous oxide, and hydrogen sulphide, carbon disulphide, nitromethane, and nitrobenzene.

4. The process of claim 3, wherein the co-solvent is selected from the group comprising: alkanes; benzene and its esters; acetates and butyrates; acetone; methyl isobutyl ketone; methyl ethyl ketone; dichloromethane; dichloro difluoromethane; dimethyl ether; diethyl ether; methyl alcohol; ethyl alcohol; n-propanol; isopropanol;
    acetic acid; formic acid; and acetonitrile (methyl cyanide).

5. The process of claim 3, wherein the co-solvent is selected from the group comprising: lower alkanes, lower alcohols having 5 carbons or less, acetone, dimethyl ether and diethyl ether.

6. The process according to any one of claims 1–5, wherein the sealed first vessel is heated to a temperature of from 40 to 60° C., inclusive in step (b).

7. The process according to any one of claims 1–5, wherein the second vessel is cooled to a temperature in the range −10° to 25° C., inclusive, in step (d).

8. The process of claim 1, wherein the substance is selected from the group comprising: seeds, nuts, ground nuts, oil shale and mud.

* * * * *